United States Patent
Griffin et al.

(10) Patent No.: US 7,721,365 B2
(45) Date of Patent: May 25, 2010

(54) KITCHEN SINK KNEE SHIELD

(76) Inventors: Russell S. Griffin, 105 Cromwell Ct., Cary, NC (US) 27513; Tony D. Nugent, 112 Crestpoint Ct., Cary, NC (US) 27513; Miles B. Dearth, 1467 Glenaire Ln., Independence, KY (US) 41051

( * ) Notice: Subject to any disclaimer, the term of this patent is extended or adjusted under 35 U.S.C. 154(b) by 675 days.

(21) Appl. No.: 11/430,290

(22) Filed: May 9, 2006

(65) Prior Publication Data

US 2008/0142090 A1    Jun. 19, 2008

Related U.S. Application Data

(60) Provisional application No. 60/717,848, filed on Sep. 19, 2005.

(51) Int. Cl.
*E03C 1/12* (2006.01)
(52) U.S. Cl. ............... 4/661; 4/654; 4/679; 248/218.4
(58) Field of Classification Search ............ 4/418, 4/654, 657–658, 661, 520, 523, 619, 638, 4/646, 648, 679, 695; 137/382; D23/303, D23/308; 248/219.4, 227.3, 227.1, 218.4
See application file for complete search history.

(56) References Cited

U.S. PATENT DOCUMENTS

| | | | | |
|---|---|---|---|---|
| 903,836 | A * | 11/1908 | Burleigh | 4/679 |
| 1,659,851 | A * | 2/1928 | Brewington | 4/643 |
| 1,682,351 | A * | 8/1928 | Rogers | 137/359 |
| 1,773,722 | A * | 8/1930 | Bonner, Jr. | 4/418 |
| 3,199,121 | A * | 8/1965 | Greto | 4/675 |
| 4,186,761 | A * | 2/1980 | Guarnieri | 4/695 X |
| 4,862,528 | A * | 9/1989 | Clarke et al. | 4/661 |
| 4,937,899 | A * | 7/1990 | Morris et al. | 4/619 X |
| 5,253,376 | A * | 10/1993 | Fait | 4/643 |
| D375,154 | S * | 10/1996 | Trueb et al. | D23/308 |
| 6,370,711 | B1 * | 4/2002 | Ferrer Beltran | 4/646 |
| 6,631,874 | B2 * | 10/2003 | Turpin et al. | 248/218.4 X |
| 6,807,691 | B1 * | 10/2004 | Hertz | 4/654 |

* cited by examiner

*Primary Examiner*—Robert M Fetsuga

(57) ABSTRACT

The disclosed knee shield is a durable, easy-to-install protective barrier that is fastened underneath sink bottoms. It protects the knees of a wheelchair user from rough and abrasive surfaces and extreme temperatures as mandated by the ADA and other federal, state, and local buildings codes. The knee shield is slotted so that it fits around the drain assembly, without requiring the removal of the sink; drain assembly, or plumber's putty that may already exist.

3 Claims, 3 Drawing Sheets

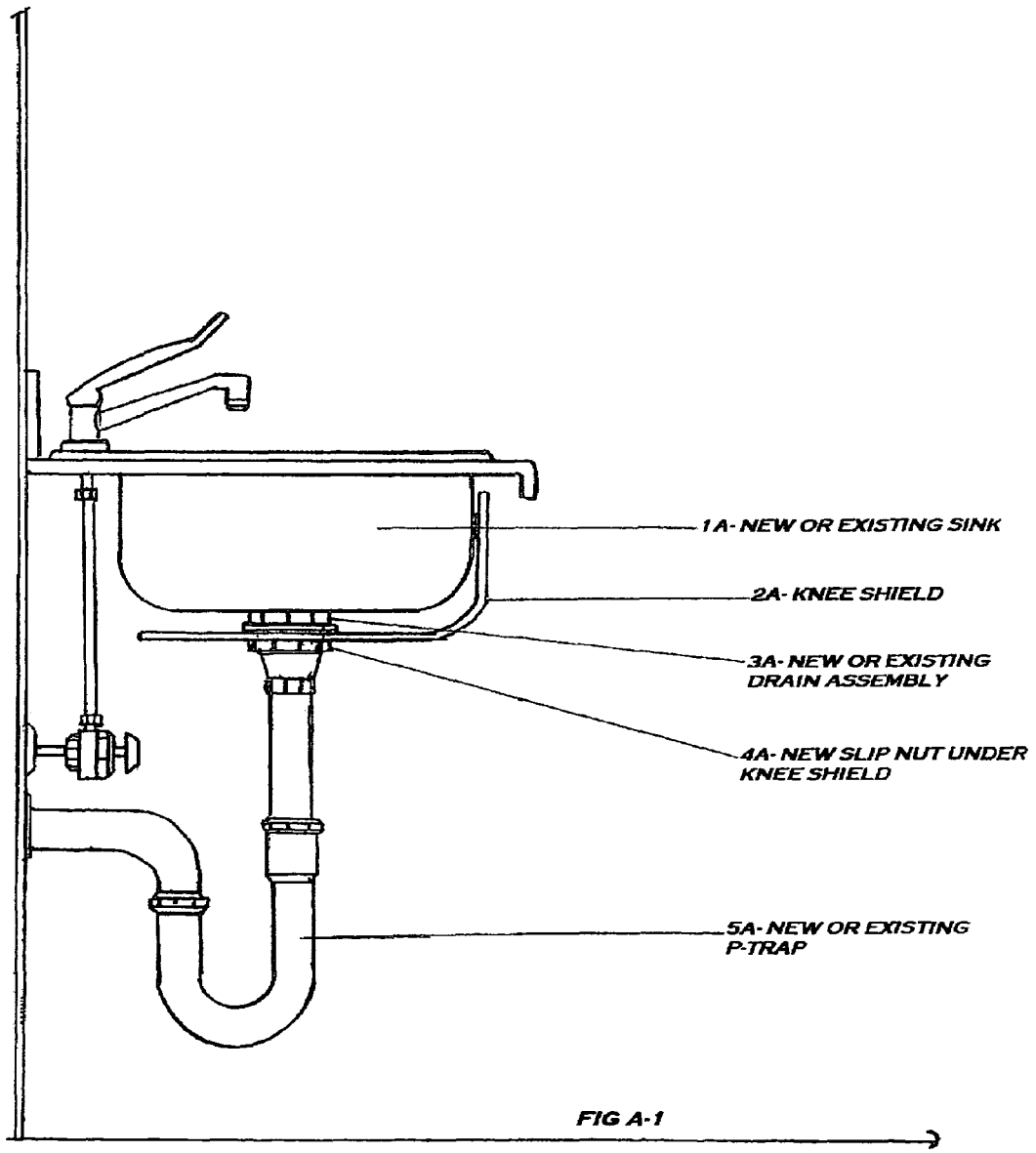

Drain Assembly With Knee Shield
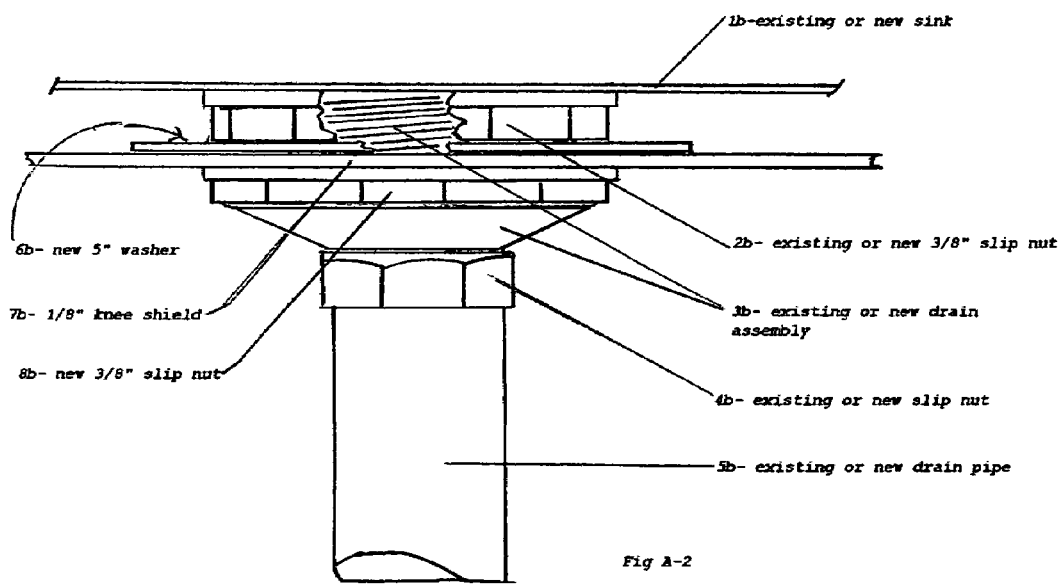
Fig A-2

Kitchen Sink Knee Shield
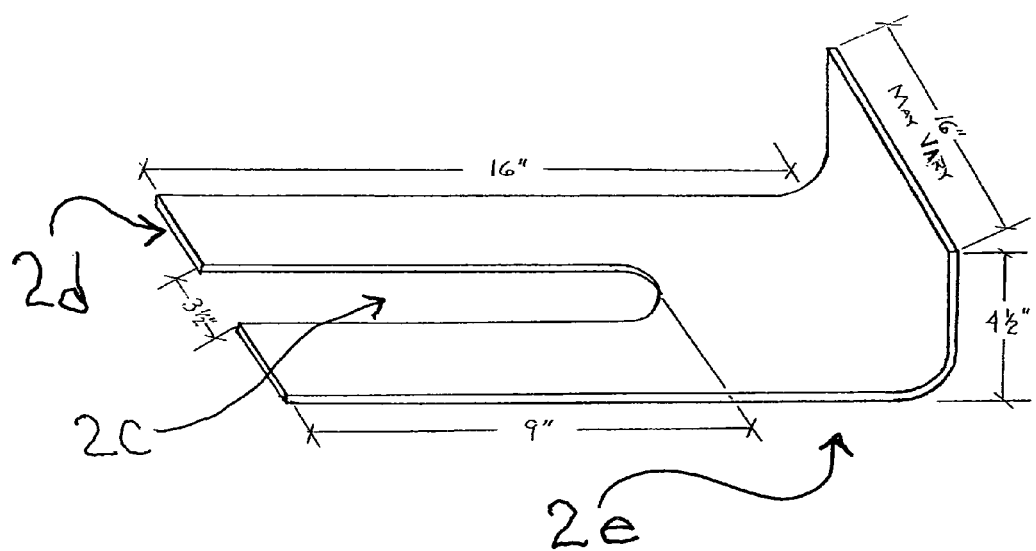
Fig A-3

KITCHEN SINK KNEE SHIELD

This is a nonprovisional application which claims the benefit of provisional application Ser. No. 60/717,848 filed on Sep. 19, 2005.

BACKGROUND OF THE INVENTION

The knee shield is a durable, easy-to-install protective barrier that is fastened underneath sink bottoms. It protects the knees of a wheelchair user from rough and abrasive surfaces and extreme temperatures as mandated by the ADA and other federal, state, and local buildings codes.

Federal and state accessibility codes require available knee space under kitchen sinks for wheelchair users. In order to achieve the mandated clear knee space the sink base cabinet doors and cabinet fronts are removed to allow better access for someone in a wheelchair. This creates multiple hazards for a wheelchair or scooter user, including scalding from boiling water poured into the sink after cooking, and from knee and leg abrasions from the rough, factory-applied coating under the sink for noise reduction. This shield protects the knees and legs of a wheelchair user whose legs are positioned under the sink during use. The shield can he used for new construction and as a retrofit on existing kitchen sinks.

BACKGROUND OF THE INVENTION

As the population ages, and more individuals survive with physically disabling diseases and paralyzing or disabling injuries, the use of assertive technology, and specifically mobility devices, is key to maintaining independence in society. In June 2000 research findings (Kay, 2000) were available to the US Department of Education. The report, *Disability Statistics Report-Mobility Device Use in the United States*, states that approximately 6.8 million non-institutionalized Americans utilize mobility assertive devices. This includes wheelchairs, scooters, walkers, and canes. Nearly 1.7 million persons are either wheelchair or scooter users. The number of wheelchair and walker users has roughly doubled between 1980 and 1990 (LaPlante, 1996). The medical conditions associated with wheelchair and scooter usage include multiple sclerosis, paraplegia, quadriplegia, and cerebral vascular disease.

In 1990, the US Congress enacted the Americans with Disabilities Act (ADA). Several years later, Congress enacted The Americans with Disabilities Act Accessible Guidelines (ADAAG) for Buildings and Facilities. This document contains scoping and technical requirements for accessibility to buildings and facilities by individuals with disabilities under the Americans with Disabilities Act (ADA) of 1990. These scoping and technical requirements are to be applied to the design, construction, and alteration of buildings and facilities covered by titles II and III of the ADA to the extent required by regulations issued by federal agencies, including the Department of Justice and the Department of Transportation, under the ADA. Along with other federally mandated accessibility building codes, each state has adopted their own codes for new construction and the rehabilitation of existing buildings. Many of these state codes mirror those of the ADAAG.

Both federal and state buildings codes mandate a percentage of the total number of covered multi-family residential apartments to be fully accessible for persons with mobility impairments. Institutional buildings, university housing, and other private, state and federally owned buildings must have accessibility code compliant public restrooms and other "common use" areas. Both federal (ADAAG) and state building codes mandate burn and rough surface protection devices for sinks in these covered buildings. This includes hot and cold water supply lines under sinks, and waste pipes and garbage disposals under sinks. These same federal and state accessibility codes require available knee space under kitchen sinks for wheelchair users. The mandated clear knee space, the hot and cold pipe and sink temperatures, and the rough surfaces under sinks creates high risk for those confined to wheelchairs.

ADA, 4.24.6 Exposed pipes and surfaces. Hot water and drain pipes exposed under sinks shall be insulated or otherwise configured so as to protect against contact. There shall be no sharp or abrasive surfaces under sink.

References:

Kaye, H. S.; Kane, T.; LaPlante, M. P., *Disability Statistics Report-Mobility Devise Use in the United States,* June 2000. Washington D.C.: US Department of Education, National Institute of Disability and Rehabilitation Research.

LaPlante, M. P.; Carison, D., *Disability in the United States: Prevalence and Causes,* 1992. Washington D.C.: US Department of Education, National Institute of Disability and Rehabilitation Research.

The many different type enclosures on the market are mostly used as a decorative appearance to sinks. Enclosures that are said to protect wheelchair users do not meet the federal and state requirements for "availed knee space under sinks." Sink base cabinet doors and cabinet fronts are removed to allow better access for someone in a wheelchair. U.S. D375,154 does not allow the wheelchair user access under the sink for better access to the sink or sink faucets. The installation of this product requires fasteners, i.e., (8)-#6× 1.2" screws. It also makes it difficult to access a garbage disposal reset switch. Also this product requires a rear-draining sink, which is more expensive than the conventional "builder grade" center draining sinks.

SUMMARY OF THE INVENTION

The present invention overcomes the problems associated with prior art by making the access under the sink more accessible while protecting the wheelchair user from burn and rough surfaces located under sinks. The unique advantage to the present invention is it does not require the expensive rear draining sinks to work, as described in the prior art D375,154, also it does not need countertops or cabinet type sidewalls. The knee shield can be used for new construction and as a retrofit on existing kitchen sinks. Installation is fast. It does not require a plumber since there are no water lines, waste pipes, or electrical wiring that need removing. The knee shield is unique in that it installs under the existing or new sink in just minutes. The knee shield comes with a five inch washer that fits under the existing slip nut on the drain assembly. The knee shield is slotted so that it fits around the drain assembly without requiring the removal of the sink, drain assembly, or plumber's putty that may already exist. No countertops or sidewalls are needed. No plumber is needed. The shield will not transfer heat from the sink bottom. The knee shield is made from high impact resistant vinyl. The knee shield can be cleaned easily and is stain resistant. The knee shield can be used on inexpensive "builder grade" sinks. The knee shield will protect the knees from rough and abrasive surfaces under the sink.

The knee shield will fit all types of sinks; including rear, center, or front draining models. It attaches to the universal drain that has a threaded body. The knee shield is unique in that it installs under the existing or new sink in just minutes.

The knee shield comes with a five-inch (1/16") washer that fits just under the existing slip nut on the drain assembly. The knee shield is then pushed into place below the provided washer. The knee shield is slotted so that it fits around the drain assembly, without requiring the removal of the sink; drain assembly, or plumber's putty that may already exist. This also allows the knee shield to fit under rear, center, or front drain type sinks.

To complete the installation a new slip nut, similar to the existing one, is placed and tightened under the knee shield. This knee shield is a lightweight, durable, and easy-to-install shield that are installed under a kitchen sink. It acts as a protective barrier for the knees and legs of a wheelchair or scooter user while being positioned at and under a kitchen sink or sink.

The test conducted show that the present invention of the knee shield was recorded by video and shows the installation was conducted in 1 minute and 38 seconds for both underneath sides of the kitchen sink. Most important the knee shield meets the same federal and state accessibility codes requiring clear knee space under sinks for wheelchair users. Therefore, the knee shield can be used for new construction and as a retrofit on existing kitchen sinks or sinks.

BRIEF DESCRIPTION OF THE DRAWINGS

FIG. A-1 is a side view of a sink with the new present invention knee shield. 1A is a side view of a new or existing sink. 2A is a side view of the present invention knee shield. 3A is a side view sink drain assembly. 4A is a new slip nut under knee shield. 5A is a side view of p-trap FIG. A-2 is a view of drain assembly with knee shield installed. 1B Existing sink or new sink. 2B Existing or new 3/8" slip nut 3B Existing or new drain assembly. 4B Existing or new slip nut. 5B Existing drainpipe or new drainpipe. 6B new 5" washer. 7B new 1/8" plastic knee shield. 8B new 3/8" slip nut.

FIG. A-3 Kitchen Sink Knee Shield

A side view of measurements approximately 16" in length and 16" in width; the height is approximately 4½" tall, the cut-out slit 2c is 3½" wide and the length 9" from edge 2d.

DETAILED DESCRIPTION OF THE PREFERRED EMBODIMENT

Referring to FIG. A-1, In order to install the shield 2A, under the new or existing sink 1A, is to detach the new or existing slip nut 4B.

Once the slip-nut 4B, is disconnected the new 5" washer 6B, is pushed up against the existing 3/8" slip-nut 2B, this will allow the shield 7B, to fit securely against the new washer SB.

As the shield 7B, moves into place it appears that the shield is a part of the sink (as referred in 1A).

Now that the shield 7B, is in place the new 3/8" slip-nut 8B, will thread on to the drain assembly 3B, and tighten against the shield 6B, once the slip-nut 8B, is hand tight. The drain pipe SB, is pushed back in place of the drain assembly 3B.

The slip-nut 4B is now ready to connect to the drain assembly 3B. It will be noted that the new slip-nut 8B, and the slip-nut 4B, will only need hand tightening as to the manufacture recommendation.

Other embodiments of the invention are described herein. FIG. 3 is a broken away side view of knee shield in section embodiment of a shield made in accordance with the present invention.

In application of the present invention, "kitchen sink knee shield" many changes, modifications, variations and uses of the present application will become apparent to those skilled in the art after considering this speciation and the drawings which disclose the preferred embodiment thereof. All such changes, modifications, variations and other uses, which do not depart from the spirit and scope of the invention, are deemed to be covered by the invention which is limited by the claims which follow.

The invention claimed is:

1. A knee shield for installation under an existing sink having a drain assembly and which provides knee access by wheelchair-bound persons and protection from undersides of the sink, the knee shield comprises a slotted knee shield (2e), washer (6b) which surrounds the drain assembly and a slip nut (8b) which engages the knee shield, said knee shield member containing a cut-out or slot open at one end which is sized to slide past and clear the drain assembly and whereby said knee shield is retained between said washer and said slip nut.

2. The knee shield according to claim 1 approximately 16 inches long by 4½ inches high and wherein the length of said slot is approximately 9 inches from the edge of said shield (A-3).

3. The knee shield according to claim 1 formed from vinyl plastic.

* * * * *